United States Patent [19]
Raphael

[11] 3,818,396
[45] June 18, 1974

[54] SUPER STABLE SUPERCONDUCTING COIL
[75] Inventor: Steven M. Raphael, Greenbelt, Md.
[73] Assignee: The United States of America as represented by the Secretery of the Navy, Washington, D.C.
[22] Filed: Apr. 9, 1973
[21] Appl. No.: 349,499

[52] U.S. Cl............................. 335/216, 317/123
[51] Int. Cl............................................. H01f 7/22
[58] Field of Search..................... 335/216; 317/123

[56] References Cited
UNITED STATES PATENTS
3,129,359  4/1964  Kunzler........................ 335/216 X
3,150,291  9/1964  Laquer.......................... 335/216 X
3,193,734  7/1965  Hempstead..................... 335/216

Primary Examiner—George Harris
Attorney, Agent, or Firm—R. S. Sciascia; Q. E. Hodges

[57] ABSTRACT

A superconducting magnet comprised of a first superconducting coil tied to a constant current source is made super stable by disposing a second superconducting coil in a manner to attain maximum flux linkage between coils. The first superconducting coil is charged from the constant current supply while the second coil is open circuited or made to be non-superconducting. When the first coil reaches the desired current, the second coil circuit is closed or allowed to go superconducting. At this time there is no current in the second coil. Thereafter, any change in reluctance due to a transient, which would usually drive the first coil normal, risking undesired heating, etc., will induce a current in the second coil which produces an equal and opposite field to that of the first coil so as to leave the net field unchanged. Thus any undesired transient current in the first coil will be resisted by the second coil.

5 Claims, 3 Drawing Figures

1

SUPER STABLE SUPERCONDUCTING COIL

The invention described herein may be manufactured and used by or for the Government of the United States of America for governmental purposes without the payment of any royalties thereon or therefor.

BACKGROUND OF THE INVENTION

This invention relates to superconducting coils and in particular to means for reducing the sensitivity of superconducting coils to transients.

Applications for superconductors have been studied for several years now; however, because of their intolerance to transients, superconductors have found limited use. These transients may take the form of reluctance variations due to relative movement of the superconducting coil to its surroundings, or they may be caused by AC currents or DC transient currents. Additionally, induced ripple currents inherent in some types of machinery have until now severely limited the usefulness of superconducting magnets in these applications.

An important use of superconducing coils is for producing high strength magnetic fields. The energy stored in these fields is proportional to both the inductance of the coil and the current flowing therethrough. This stored energy reaches appreciable levels as superconducting coils are operated at high inductive levels and carry high current.

An inherent characteristic of superconducting wire is that at some critical value of current and/or magnetic field, the superconductor will go normal, i.e., become resistive. If in operation, a superconducting coil is allowed to go normal, for example, due to a current or field transient which exceeds a critical value, its magnetic field will rapidly collapse and the energy stored therein will be dissipated in a form of heat. This is an undesirable result since the heat thereby generated may cause the cryogenic fluid cooling the superconductor to evaporate at an explosive rate and/or burn out the coil itself.

In the prior art, many of the protective measures have been directed to arresting the problematic consequences of heat generated after the superconducting coil goes normal. Some of these prior art devices provide a nonsuperconducting, highly conductive secondary coil with a long time constant inductively coupled to the primary superconducting coil. If the primary should go normal, the stored field energy is transferred to the secondary coil by transformer action. The long time constant in the secondary controls, the rate of field collapse in the primary, and owing to the high conductivity of the secondary, translation of current into heat energy is minimized inside the cryostat. The secondary is coupled by way of connecting leads to an external dumping circuit, such as a thermal mass, where the energy is dissipated in the form of heat. A disadvantage of this type of system, especially with large superconducing coils is that relatively heavy conductors are required between the secondary and the dumping circuit in order to avoid excessive inductive voltages. These conductors, however, also conduct heat into the cryostat during normal operation resulting in a loss of coolant and hence requiring additional refrigeration capacity. Moreover, a system of this type suffers a major limiting factor in that it treats the symptoms of the problem and not the cause. That is, it is only effective after the super-conducting coil goes normal. This prior art system does nothing to prevent or minimize the possibility of the superconductor from going normal due to transients.

One prior art means of limiting transients has been the use of eddy current shields, the size and thickness of which depend upon the speed of the transient — becoming large as the speed decreases. Another way of protecting coils from transients has been to stabilize the actual wire by using stranding and twisting and copper cladding. Although such wire may still be employed in this invention, the average amount of copper cladding can be reduced. Copper cladding reduces the average current density that can be maintained in a superconducting magnet due to its added cross section. The above prior art methods are satisfactory over very limited ranges and severely effect the usefulness of superconductors for some applications.

SUMMARY OF THE INVENTION

Accordingly, it is a general object of this invention to minimize the possibility of a super-conducting coil going normal in response to transients.

It is a more specific object of this invention to reduce the sensitivity of a superconducting coil to transients.

Briefly, the above objects are accomplished by providing a second super conducting coil inductively coupled to the primary superconducting coil. Initially, the secondary coil is open circuited and remains so until the primary coil charges up to the desired constant current level. When the primary coil reaches the desired current level, the secondary coil circuit is closed. Thereafter, any change in reluctance due to a transient, which would normally drive the superconducting primary coil normal, will induce a current in the superconducting secondary coil which produces an equal and opposite field to that of the primary so as to leave the net field unchanged. Thus, any undesired transient current in the primary will be resisted by the secondary.

Various other objects and advantages will appear from the following description with respect to the accompanying drawing showing a preferred embodiment of the invention; and the novel features will be particularly pointed out hereinafter in connection with the appended claims.

DETAILED DESCRIPTION

Figure 1:
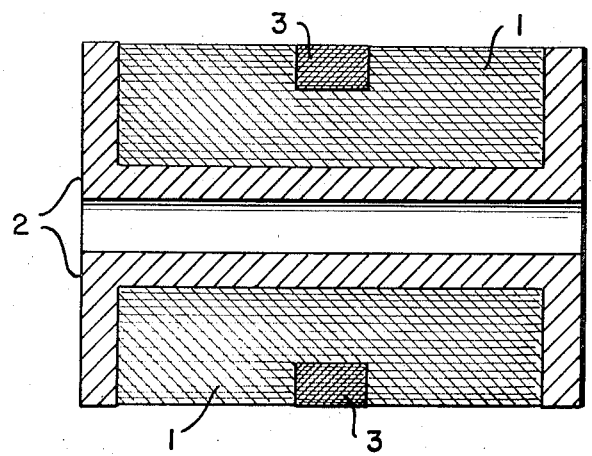
FIG. 1 is a cross-sectional view of one embodiment of the invention showing the secondary coil compactly wound closely to the axial turn-around point of the magnetic flux in the primary coil.

In the illustrated embodiment of the invention in FIG. 1, superconducting coil 1 is formed by winding superconducting wire on a coil form 2 in a conventional fashion except for the space allowed for superconducting coil 3. Coil form 2 may be of aluminum, brass or stainless steel, the latter two being preferred because their thermal expansion coefficients more closely match those of the typical superconducting material comprising the wires. Such wire may be formed of, for example, copper with strands of Nb-Ti alloy running therethrough or any other superconducting wire known in the art.

Figure 3:
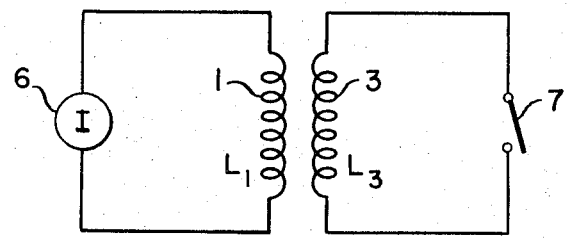
FIG. 3 is an equivalent circuit diagram of a superconducting coil equipped with the stabilizing superconducting secondary coil of the invention.

Coil 1 would normally be non-persistent, tied to a constant current source 6 as shown in FIG. 3. However, in some applications coil 1 would be persistent and be activated by a flux pump.

Coil 3, in the embodiment of FIG. 1, is centrally located in a groove provided in coil 1 so as to be close to the axial turn-around point of flux generated by coil 1. This is done to assure a flux linkage from coil 1 to coil 3 approaching 100 percent. Of course, 100 percent linkage can theoretically only be realized by a zero dimension wire located exactly at the axial turn-around point of flux of coil 1 so that it would enclose 100 percent of the magnetic flux lines generated by coil 1. However, values close to 100 percent of flux linkage can be realized by the embodiment of FIG. 1.

Coil 3 is a persistent current coil which can be open circuited by a mechanical switch as in FIG. 3, or made nonsuperconducting by locally heating a portion of the superconductor, or by maintaining a region above the level of the cryogenic fluid. These techniques are well known in the art. Coil 3 is sized to handle the expected transients without going normal due to rapid changes in current. The higher the inductance of coil 3, the smaller the current necessary to compensate for a given transient. An equally important design criteria is the response time of coil 3. Response time is directly proportional to inductance. It is clear that in any specific application current density and response time may be adjusted according to the needs of the system.

Figure 2:
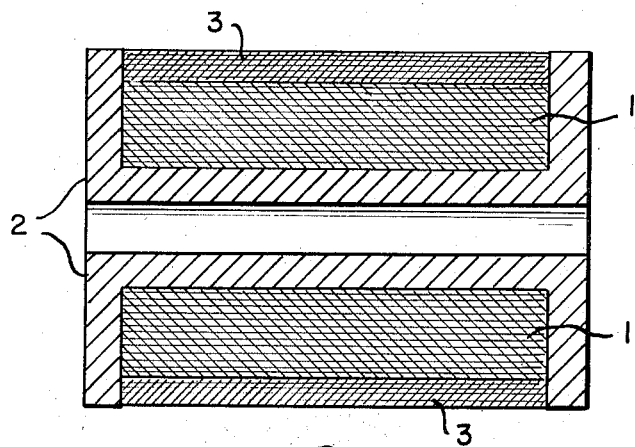
FIG. 2 is a cross-sectional view of another embodiment of the invention showing the secondary coil evenly distributed along the length of the primary coil.

Although the embodiment of FIG. 1 is desirable from a flux linkage standpoint, the fabrication technique for forming the groove in coil 1 is tedious and expensive. FIG. 2 shows an embodiment wherein the only difference is that coil 3 is distributed evenly along coil 1. A small decrease in flux linkage is given for an increase in the ease of fabrication.

The operation of the superstabilized superconducting coil is as follows. Referring now to FIG. 3, while switch 7 is open (or alternatively, coil 3 made nonsuperconducting) coil 1 is allowed to charge to a desired current level. When coil 1 reaches the desired current level maintained by constant current supply 6, switch 7 is closed (or coil 3 is made super-conducting) which short circuits coil 3. At this time, there is no current in coil 3. However, a change in reluctance due to a transient, which would usually drive coil 1 by itself normal, will induce a current in coil 3. The current so induced produces its own magnetic field equal and opposite to the transient field of coil 1 so as to leave the net field unchanged. The induced current meeting no resistance in coil 3, continues to flow until the transient reverses which would tend to induce a current in the opposite direction. In effect, then, instead of the unwanted energy produced by the transient being dissipated as heat, as would occur with an eddy current shield, the method of this invention stores energy in the form of electric current to be returned to the outside world when the transient reverses.

When it is desirable to change the current through coil 1, coil 3 must again be open circuited or driven normal; otherwise, it will attempt to prevent a change in coil 1. In summary, any undesired change in current and/or field in coil 1 will be resisted by coil 3.

In principle, the superstabilized coil acts like a transformer which can have its secondary coil open or shorted. When coil 3 is open circuited, the impedance of coil 1 is $Z_1 = R_1 + J\omega L_1$. Since coil 1 is superconducting, its resistance $R_1$ is zero. When coil 3 is short circuited $$Z_1 = R_1 + J\omega L_1 + (W^2 M^2)/(A_3 + J\omega L_3 + Z_i)$$

where the third term on the right side of the equation is the reflected impedance. The load impedance z is zero since coil 3 is short circuit and coil resistances $R_1$ and $R_3$ are also zero since both coils are superconducting. As the mutual inductance, $M$, equals $\sqrt{L_1 L_3}$ and the coefficient of coupling is close to 1, the total impedance of coil 1 reduces to $Z_1 \cong J\omega L_1 - J\omega L_1 = 0$.

Thus, no change can occur in the field of coil 1 since coil 3 will produce an equal and opposite field to oppose any change. If coil 3 has a lower inductance than coil 1, it will respond faster than coil 1 to any changes in the environment thus protecting coil 1. Further, since coil 3 has no current initially passing through it, while coil 1 does, it is not as sensitive to transients as is coil 1.

It will be understood that various changes in the details, materials, steps, and arrangements of parts, which have been herein described and illustrated in order to explain the nature of the invention, may be made by those skilled in the art within the principle and scope of the invention as expressed in the appended claims.

What is claimed is:
1. A superconducting magnet comprising:
   a primary coil including a plurality of turns of superconducting wire;
   means for charging said primary coil to a desired constant current level;
   a secondary coil including a plurality of turns of superconducting wire wound coaxially about and thereby inductively coupled without electrical connection to said primary coil; and
   means for open circuiting said secondary coil when said primary coil is charging up to said desired constant current and for short circuiting said secondary coil when said primary coil has attained said desired current level.

2. A superconducing magnet comprising:
   a primary coil including a plurality of turns of superconducting wire;
   means for charging said primary coil to a desired constant current level;
   a secondary coil including a plurality of turns of superconducting wire wound coaxially about, evenly distributed substantially along the entire length of, and thereby inductively coupled with, said primary coil; and
   means for open circuiting said secondary coil when said primary coil is charging up to said desired constant current and for short circuiting said secondary coil when said primary coil has attained said desired current level.

3. A superconducting magnet comprising:
   A primary coil including a plurality of turns of superconducting wire and provided with a coaxial groove centrally located between the ends of said coil;

means for charging said primary coil to a desired constant current level;

a secondary coil including a plurality of turns of superconducting wire wound coaxially about, compactly in said groove of, and thereby inductively coupled with, said primary coil so as to be close to the axial turnaround point of flux generated by said primary coil; and means for open circuiting said secondary coil when said primary coil is charging up to said desired constant current and for short circuiting said secondary coil when said primary coil has attained said desired current level.

4. A superconducting magnet comprising:

a primary coil including a plurality of turns of superconducting wire;

means for charging said primary coil to a desired constant current level;

a secondary coil including a plurality of turns of superconducting wire wound coaxially about, evenly distributed substantially along the entire length of, and thereby inductively coupled with, said primary coil; and means for making said secondary coil nonsuperconducting when said primary superconducting coil is charging up to said desired constant current and for making said secondary coil superconducting when said primary coil has attained said desired current level.

5. A superconducting magnet comprising:

a primary coil including a plurality of turns of superconducting wire and provided with a coaxial groove centrally located between the ends of said coil;

means for charging said primary coil to a desired constant current level;

a secondary coil including a plurality of turns of superconducting wire wound coaxially about, compactly in said groove of, and thereby inductively coupled with, said primary coil so as to be close to the axial turn-around point of flux generated by said primary coil; and means for making said secondary coil non-superconducting when said primary superconducting coil is charging up to said desired constant current and for making said secondary coil superconducting when said primary coil has attained said desired current level.

* * * * *